United States Patent [19]

Bowman et al.

[11] Patent Number: 5,524,722

[45] Date of Patent: Jun. 11, 1996

[54] SKID STEER LOADER SEAT MECHANISM

[75] Inventors: Robert L. Bowman, Ephrata; Douglas G. Branham, Leola, both of Pa.

[73] Assignee: New Holland North America, Inc., New Holland, Pa.

[21] Appl. No.: 343,396

[22] Filed: Nov. 22, 1994

[51] Int. Cl.⁶ .................................................. B62D 25/10
[52] U.S. Cl. ...................... 180/89.17; 296/65.1; 297/331; 297/335
[58] Field of Search ...................... 180/89.17; 296/65.1; 297/331, 332, 334, 335, 325–328

[56] References Cited

U.S. PATENT DOCUMENTS

| 4,025,108 | 5/1977 | Leighty et al. | 297/335 |
| 4,076,302 | 2/1978 | Sable | 297/331 X |
| 4,364,602 | 12/1982 | Rigazio | 297/334 |
| 4,565,407 | 1/1986 | Brautigam | 297/335 |
| 4,930,593 | 6/1990 | Swartzendruber et al. | 180/89.17 |

Primary Examiner—Christopher P. Ellis
Attorney, Agent, or Firm—Larry W. Miller; Frank A. Seemar

[57] ABSTRACT

A skid steer loader is disclosed with an operator's seat that is movable between a lowered operative position and an elevated inoperative position to facilitate the access to drive components located beneath the seat. The seat includes a latch mechanism that detachably fixes the operator's seat to the loader frame and a prop rod slidable within a bayonet slot formed in the loader frame to move into a restraining position whenever the operator's seat is moved into the elevated inoperative position. The movement of the prop rod into the restraining position of the bayonet slot requires a positive movement of the prop rod out of the restraining position to enable the seat to be returned to the lowered operative position to be latched against the frame. The seat is hinged to the loader frame to allow the movement thereof between the operative and inoperative positions.

7 Claims, 4 Drawing Sheets

SKID STEER LOADER SEAT MECHANISM

BACKGROUND OF THE INVENTION

This invention relates generally to skid steer loaders, and, more particularly, to a mechanism for moving the operator's seat to a non-interfering position so that access to the operative components located below the seat can be facilitated.

Skid steer loaders are industrial equipment having longitudinally spaced pairs of wheels fixed to the frame or chassis of the loader to permit a driving rotation thereof. Each of the wheels are driven, usually by hydraulic motors powered from an engine supported by the frame of the loader. Steering of the skid steer loader is accomplished by powering the rotation of the wheels on opposing sides of the frame of the loader at differential speeds.

Typically, the hydraulic motors and associated linkages are located beneath the seat of the skid steer loader. To service the apparatus beneath the seat, it is necessary to remove the seat from the loader, which is usually accomplished by unbolting the seat from the frame and physically relocating the seat out of the relatively small operator's cab area in which the seat is normally located. The removal of the bolts fastening the seat to the loader frame, and the subsequent re-insertion of the bolts to properly replace the seat, requires a significant amount of time, particularly in comparison to the normal time required for minor servicing of these components.

Accordingly, it would be desirable to provide a means for quickly removing the operator's seat from the frame of a skid steer loader, and for then re-mounting the seat back to the frame, to facilitate the servicing of drive components located beneath the seat.

SUMMARY OF THE INVENTION

It is an object of this invention to overcome the aforementioned disadvantages of the prior art by providing a latch mechanism for selectively fixing the operator's seat of a skid steer loader in either a lowered operative position detachably fixed to the loader frame or an elevated inoperative position in which access to the drive components located beneath the seat can be had.

It is another object of this invention to provide an operator's seat hinged to the loader frame to permit the seat to be raised easily to an elevated inoperative position whereby access to the drive components beneath the seat can be facilitated.

It is a feature of this invention that the latch mechanism fixes the operator's seat to the frame of the loader in a manner to satisfy governmental regulations concerning such matters.

It is an advantage of this invention that the operator's seat can be raised to an inoperative position simply by unlatching the seat from the loader frame and raising the seat.

It is another feature of this invention that the operator's seat is automatically restrained in an inoperative position simply by raising the seat to its inoperative position.

It is another advantage of this invention that the operator's seat can be quickly and easily moved between its operative and inoperative positions.

It is still another advantage of this invention that the operator's seat requires position movement to effect an unlatching of the seat whenever the seat is in either the operative or inoperative positions.

It is still another feature of this invention that the latch mechanism includes a prop rod attached to the seat and engaged with a bayonet slot formed in the loader frame to move into a restraining position when the seat is raised to its inoperative position.

It is yet another advantage of this invention that the prop rod requires a positive movement out of the restraining position to enable the operator's seat to return to a lowered operative position.

It is still another object of this invention to provide a latch mechanism for a skid steer loader seat which is durable in construction, inexpensive of manufacture, carefree of maintenance, facile in assemblage, and simple and effective in use.

These and other objects, features and advantages are accomplished according to the instant invention by providing a skid steer loader with an operator's seat that is movable between a lowered operative position and an elevated inoperative position to facilitate the access to drive components located beneath the seat. The seat includes a latch mechanism that detachably fixes the operator's seat to the loader frame and a prop rod slidable within a bayonet slot formed in the loader frame to move into a restraining position whenever the operator's seat is moved into the elevated inoperative position. The movement of the prop rod into the restraining position of the bayonet slot requires a positive movement of the prop rod out of the restraining position to enable the seat to be returned to the lowered operative position to be latched against the frame. The seat is hinged to the loader frame to allow the movement thereof between the operative and inoperative positions.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
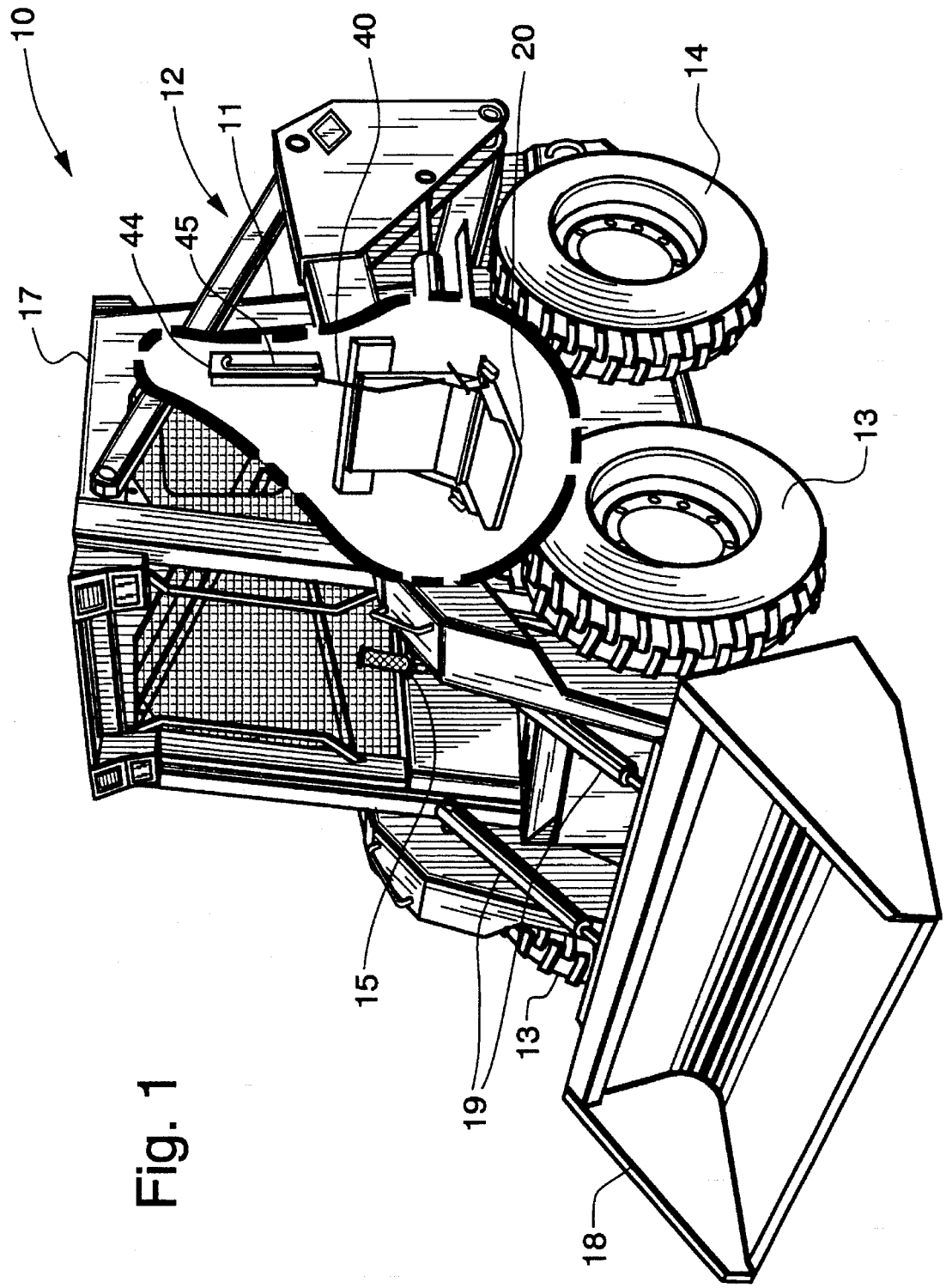
FIG. 1 is a left, front perspective view of a skid steer loader incorporating the principles of the instant invention, a portion of the external structure of the skid steer loader being broken away to reveal the location of the seat pan mounted according to the principles of the instant invention.

Referring now to the drawings and, particularly, to FIG. 1, a representative view of a skid steer loader incorporating the principles of the instant invention can best be seen. Any left and right references are used as a matter of convenience and are determined by standing at the rear of the skid steer loader and facing the forward end in the normal direction of travel. The skid steer loader 10 comprises a fixed wheeled vehicle having a frame 11, opposing pairs of front and rear wheels 13, 14 rotatably supported by the frame for movement over the ground.

As is conventional in such machines, the wheels 13, 14 of the skid steer loader 10 are rotatably driven by hydraulic motors (representatively shown at 16) operatively powered from an engine 12 supported from the frame 11. Steering of the skid steer loader 10 is accomplished by differential driving of opposing left and right side wheels 13, 14 in a conventional manner through the use of a pair of control sticks 15. The frame 11 defines an operator's cab 17 in which the operator sits to maneuver the loader 10. A work implement, shown in FIGS. 1–5 as a bucket 18, is powered in a conventional manner by hydraulic cylinders 19 to locate the work function immediately forwardly of the operator's cab 17.

Figure 2:
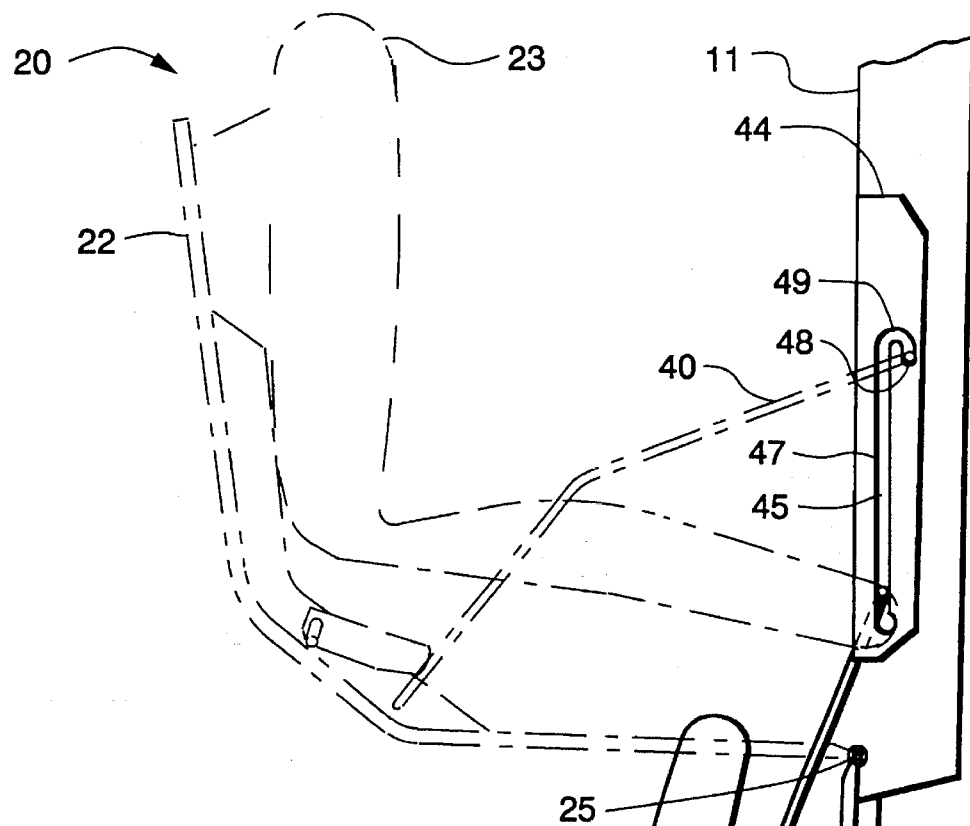
FIG. 2 is a partial side elevational view of the operator's seat mounted to the loader frame in a lowered operative position according to the principles of the instant invention, the movement of the operator's seat into an elevated inoperative position being shown in phantom.
Figure 2:
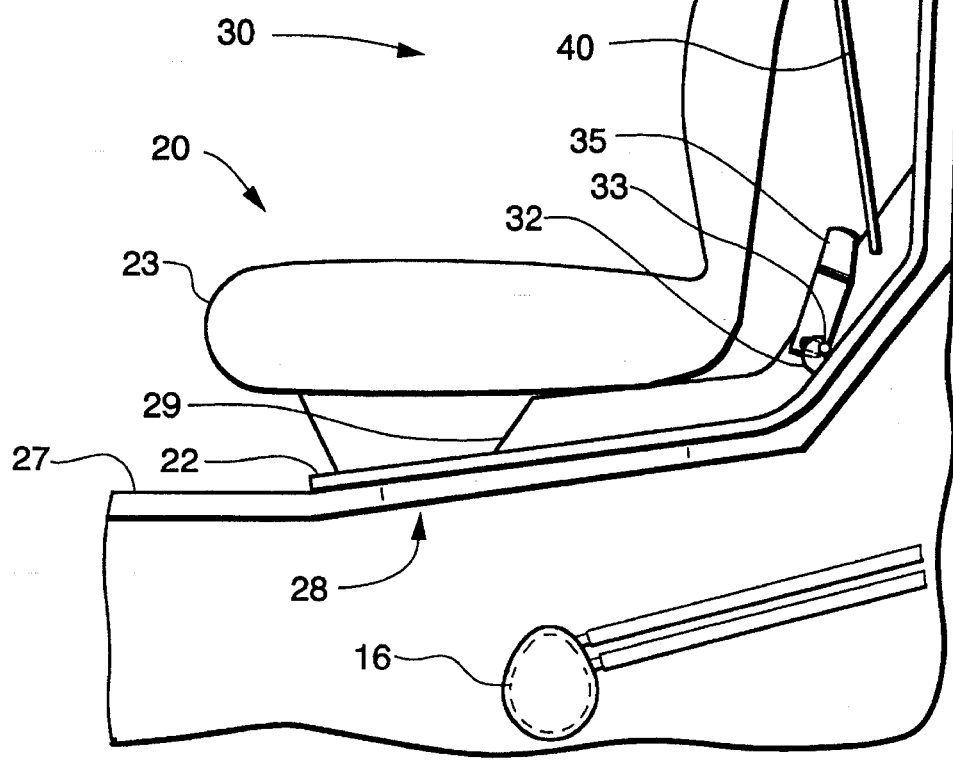

Referring now to FIGS. 1 and 2, the operator's cab 17 includes an operator's seat 20 fixed to the frame 11 in a location to provide the operator with a view of the work implement 18. The seat 20 is manufactured with a seat pan 22 forming the support for the seat cushion 23 on which the operator sits. The seat pan 22 is pivotally mounted to the frame 11 by means of a horizontally extending, transverse hinge 25. The seat cushion 23 is affixed to the seat pan 22 in a known manner to pivotally move with the seat pan 22 about the hinge 25. Accordingly, the seat 20 is movable between a lowered operative position, as shown in solid lines in FIG. 2, in which the operator may be seated to operate the loader 10, and an elevated inoperative position, shown in phantom in FIG. 2, in which the conventional drive components, such as the hydraulic motors 16, beneath the seat 20 can be accessed through an opening 28 in the floor 27 of the operator's cab 17.

Figure 3:
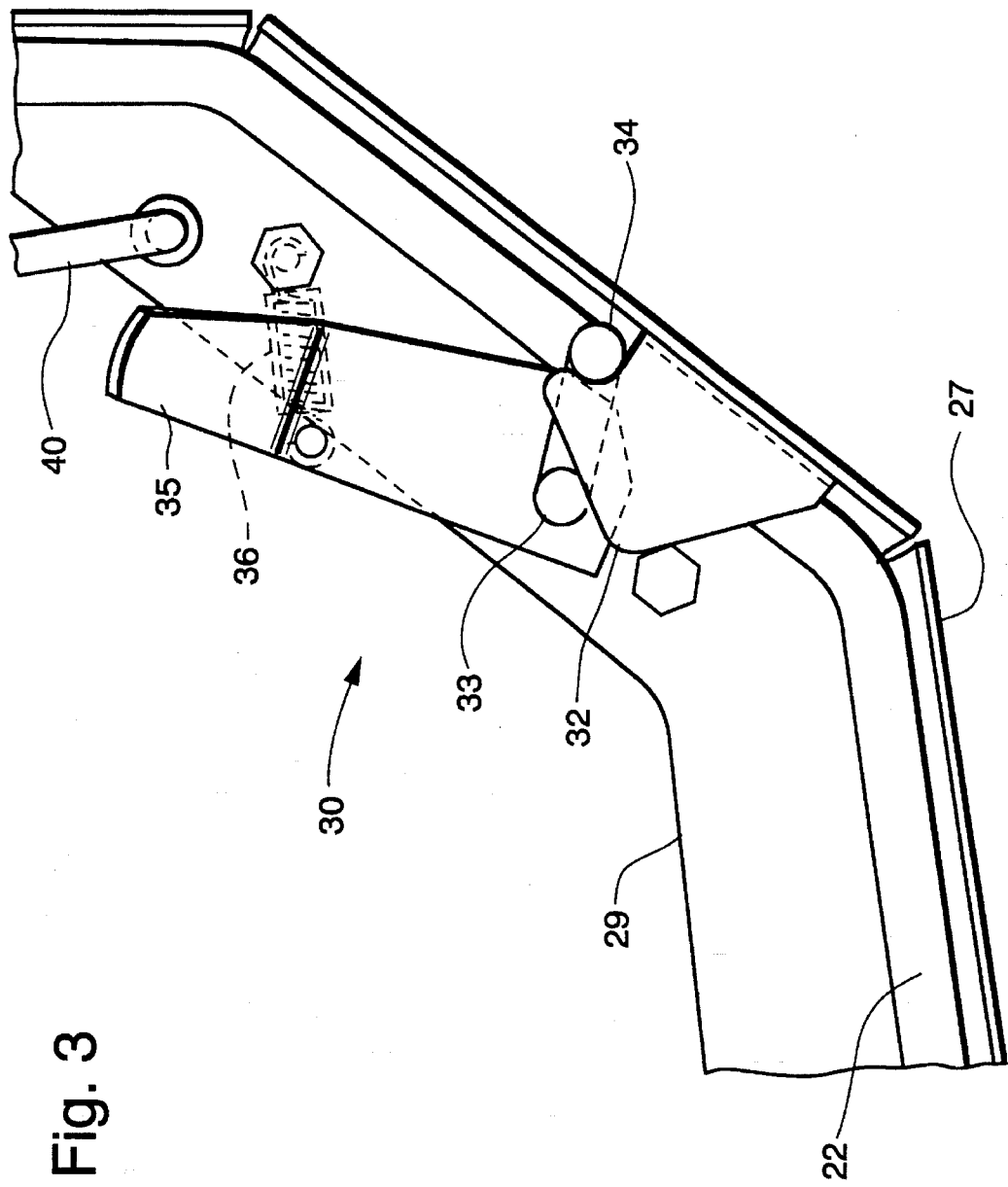
FIG. 3 is an enlarged partial side elevational view of the latch mechanism detachably fixing the operator's seat to the loader frame.
Figure 4:
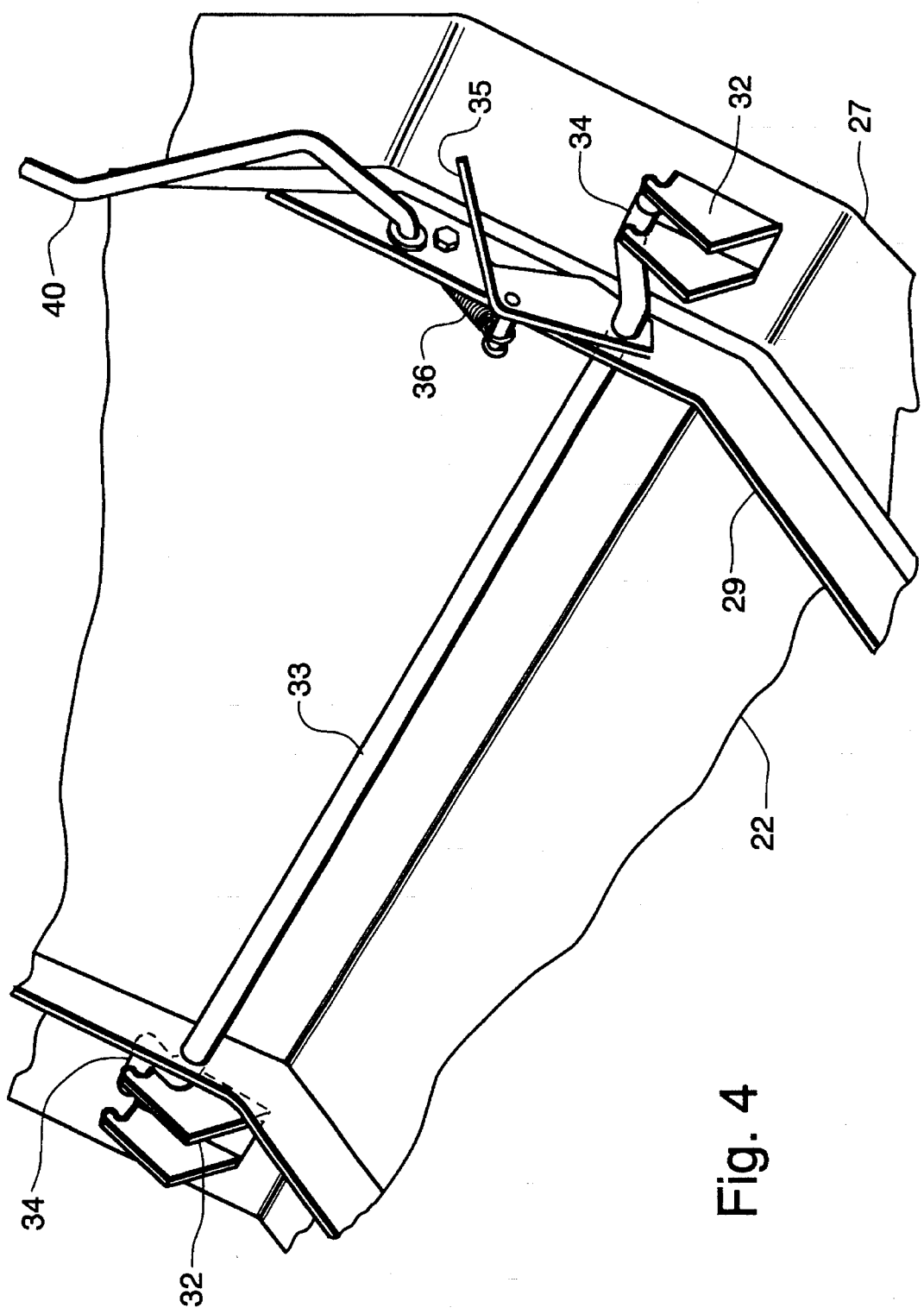
FIG. 4 is a perspective view of the latch mechanism shown in FIG. 3.

As can be best seen in FIGS. 2–4, the seat 20 is provided with a latch mechanism 30 for detachably fixing the seat pan 22 to the frame 11 while in the operative position. The latch mechanism 30 includes a pair of laterally spaced striker brackets 32 affixed to the operator's cab 17, so as to be supported from the frame 11, adjacent the seat pan 22. A transversely extending latch rod 33 is connected to the seat pan 22 between the seat pan 22 and the seat cushion 23 and has bent ends 34 that extend laterally outwardly beyond the seat pan 22 to engage the respective striker brackets 32. The latch rod 33 is rotatably supported by a pair of laterally spaced flanges 29 affixed to the seat pan 22 so that the ends 34 can be rotated into and out of engagement with the striker brackets 32. A latch release 35 is fixed to the latch rod 33 to actuate selective rotation thereof. A spring 36 interconnecting the adjacent flange 29 and the latch release 35 urges the latch rod ends 34 toward engagement with the striker brackets 32.

The latch mechanism 30 further includes a prop rod 40 pivotally connected to the left flange 29 of the seat pan 22 adjacent the latch release 35 and extending upwardly therefrom to a bayonet slot 45 formed in a bracket 44 affixed to the frame 11. The bayonet slot, as can be best seen in FIG. 2, is formed with a first generally linear slide portion 47 and an integral parallel restraining portion 48 connected thereto by an arc portion 49 to form a continuous path for the movement of the prop rod 40 between the restraining portion and the linear slide portion 47. As can be seen in phantom in FIG. 2, the movement of the seat 20 into the elevated inoperative position effects a movement of the prop rod 40 along the slide portion 47 and into the restraining portion 48, at which point the seat 20 is restrained in the inoperative position.

In operation, the seat 20 in normally in the lowered operative position as shown in solid lines in FIG. 2 with the seat pan 22 firmly locked into the operative position by the engagement of the latch rod ends 34 with the laterally spaced striker brackets 32. With the engagement of the latch rod 33 and the striker brackets 32, the seat 20 is rigidly secured into place against the frame 11 and passes all known governmental regulations relating to the securement of the seat 20.

When the need arises to service components, such as the hydraulic motors 16, of the loader 10 beneath the seat 20, the seat 20 must be raised to the elevated inoperative position shown in phantom in FIG. 2. The release of the seat pan 22 from its rigid securement against the frame 11 is accomplished by a pulling of the latch release 35 forwardly toward the work implement 18 to effect a rotation of the latch rod 33 and a disengagement between the latch rod ends 34 and the striker brackets 32. The unlatching of the seat pan 22 from the frame 11 allows the seat pan 22 and attached seat cushion 23 to be pivotally moved about the hinge 25 into the elevated inoperative position.

As noted above, the geometry of the interconnection of the prop rod 40 with the flange 29 and the bracket 44 relative to the hinge 25 is such that the raising of the seat 20 toward the inoperative position causes the prop rod 40 to move upwardly along the linear slide portion 47 of the bayonet slot 45, through the arc interconnecting the slide portion 47 and the restraining portion 48, and into the restraining portion, all of which occurs automatically as a result of the raising of the seat 20. Once the seat 20 has reached the inoperative position and the prop rod in located in the restraining portion 48 of the bayonet slot 45, the seat 20 is restrained in the inoperative position as the downward movement of the seat 20 urged by gravity causes the prop rod 40 to pull downwardly on the restraining portion 48. Accordingly, the seat 20 will be retained in the inoperative position until additional positive action is taken to permit the return to the operative position.

To return the seat 20 to the operative position latched against the frame 11, the prop rod 40 must be manually lifted out of the restraining portion 48 of the bayonet slot 45 to allow the prop rod to move along the slide portion 47 as the seat 20 is lowered toward the operative position. Once the latch rod ends 34 reach the striker brackets 32, the latch rod 33 can again be engaged with the striker brackets 32, whether by a manual manipulation of the latch release 35 to cause an appropriate rotation of the latch rod 33 or by the deflection of the latch rod 33 against the striker brackets 32 to cause a rotation of the latch rod 33 and an extension of the spring 36. After re-engagement of the latch rod ends 34 with the respective striker brackets 32, the spring 36 will urge the rotation of the latch rod 33 against the striker brackets 32 until the force of the spring 36 is overcome by the manual manipulation of the latch release 35 as described above.

One skilled in the art will readily realize that other apparatus can be devised to effect the raising of the seat 20 to an elevated inoperative position. For example, the utilization of a track mechanism to guide the seat 20 to the inoperative position could be substituted for the hinge connection 25.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A skid steer loader comprising:

a frame adapted for movement over the ground by a pair of fore-and-aft wheels fixed to each lateral side of said frame;

a seat pivotally connected to said frame by a hinge to permit a generally vertical movement of said seat between a lowered operative position and an elevated inoperative position;

a latch mechanism operatively interconnecting said seat and said frame to retain said seat in said operative position when said latch mechanism is engaged, the disengagement of said latch mechanism permitting said seat to move to said inoperative position;

a guide member including a bracket affixed to said frame above and behind said seat, said bracket being formed with a vertically oriented bayonet slot having a generally vertical slide portion and an integral restraining portion;

a prop rod interconnecting said seat and said guide member, said bayonet slot forming a path for the movement of said prop rod, said prop rod being movable into said restraining portion by the vertical movement of said seat into said inoperative position which is selectively operable to restrain said seat in said inoperative position until said prop rod is moved from said restraining position to said slide position.

2. The skid steer loader of claim 1 wherein said latch mechanism comprises:

a striker member affixed to said frame on opposing lateral sides of said seat;

a latch rod supported by said seat for engagement with said striker members; and a latch release connected to said latch rod to effect movement thereof for a latching engagement of said striker members.

3. The skid steer loader of claim 2 wherein said seat includes a seat cushion affixed to a seat pan having a pair of laterally spaced flanges projecting outwardly therefrom, said latch rod being rotatively supported by said flanges.

4. The skid steer loader of claim 3 wherein said latch rod includes opposing bent ends such that the rotation of said latch rod effects a movement of said bent ends to move into and out of engagement with said striker member, said latch release being manipulatable to effect rotation of said latch rod.

5. The skid steer loader of claim 4 wherein said latch release includes a spring interconnecting said latch release and a corresponding one of said flanges to urge said bent ends into engagement with the corresponding striker members.

6. The skid steer loader of claim 1 wherein said restraining portion is oriented generally parallel to said slide portion and is connected therewith by an arc portion to provide a continuous path for the movement of said prop rod.

7. The vehicle of claim 6 wherein the gravitational forces exerted on said prop rod by said seat placed into said inoperative position retain said prop rod within said restraining portion, said prop rod requiring the exertion of an external force to physically move said prop rod from said restraining portion into said slide portion in order to permit the movement of said seat from said inoperative position to said operative position.

* * * * *